United States Patent [19]
Kiovsky

[11] 3,764,515
[45] Oct. 9, 1973

[54] PROCESS FOR HYDROCRACKING HEAVY HYDROCARBONS

[75] Inventor: Thomas E. Kiovsky, El Sobrante, Calif.

[73] Assignee: Shell Oil Company, New York, N.Y.

[22] Filed: Apr. 23, 1971

[21] Appl. No.: 137,044

Related U.S. Application Data

[63] Continuation-in-part of Ser. No. 879,572, Nov. 24, 1969, abandoned.

[52] U.S. Cl. .................................. 208/10, 208/108
[51] Int. Cl. .............................................. C10g 1/06
[58] Field of Search ........................................ 208/10

[56] References Cited
UNITED STATES PATENTS 2,191,156   2/1940   Pier et al. ............................. 208/10
3,355,376  11/1967   Gorin et al. ........................... 208/10
3,542,665  11/1970   Wald .................................... 208/10

Primary Examiner—Oscar R. Vertiz
Assistant Examiner—S. B. Shear
Attorney—Leonard P. Miller and Harold L. Denkler

[57] ABSTRACT

There is disclosed a process for hydrocracking coal or other heavy hydrocarbon fractions employing a molten catalyst system, including a mineral acid that is stable at reaction conditions, and a metal halide catalyst selected from zinc chloride, bromide or iodide, antimony bromide or iodide, tin bromide, titanium iodide, arsenic bromide or iodide, mercuric bromide or iodide, gallium bromide, or bismuth bromide. If a halogen acid is employed as the mineral acid, it is preferred that the halogen in the metal salt correspond to the halogen in the acid.

5 Claims, No Drawings

PROCESS FOR HYDROCRACKING HEAVY HYDROCARBONS

BACKGROUND OF THE INVENTION

This is a continuation-in-part of application Ser. No. 879,572, filed Nov. 24, 1969 and now abandoned.

Extremely heavy hydrocarbon fractions, whether they occur as coal, residual fractions from petroleum, or tars from other sources, have many common problems when such materials are processed to make lower boiling and more valuable materials from them. The heavy hydrocarbons are hydrogen deficient, that is, they contain proportionately less combined hydrogen than lower boiling hydrocarbon fractions. Accordingly, in order to process such hydrocarbons into lower boiling hydrocarbons it is necessary to provide hydrogen and both hydrogenating and cracking conditions. Coal and residual hydrocarbons also contain ingredients that are catalyst poisons, particularly poisons for the catalysts that are required for hydrocracking. Heteroatomic oxygen, sulfur and nitrogen in coal, for example, seriously affect the usual supported metal hydrogenating catalysts while heteroatoms and organo-metallic compounds contained in residual petroleum fractions seriously influence catalyst activity. Additionally, conditions under which cracking and hydrogenation of coal and residual fractions can be accomplished generally are such that the processes cannot be performed economically and are therefore unable to compete successfully with lower cost sources of hydrocarbons such as the distillate fractions of a crude oil.

Recently metal halide catalysts have been found that are both active enough and stable enough to be employed in hydrocracking coal and residual oil fractions at low enough temperatures and pressures so that the process can be effected economically. The metal halides employed must have balanced properties with regard to activity and stability. That is, the highly active metal halide catalysts generally are unstable at reaction conditions and are reduced to the metal and the corresponding hydrogen halide, while metal halides having good stability at reaction conditions generally are less active as catalysts, so that high temperatures and pressures are required which not only cause the aforementioned uneconomical processing conditions, but produce a product with an undesirable distribution between gases and normally liquid hydrocarbons. The various metal halide catalysts have different properties that adapt them to different charge stocks and for producing different products. Thus, some of the metal halides are very active although inclined to be unstable, other metal halides are very stable although inclined to be inactive, some metal halides have good resistance to specific poisons while others are particularly adapted to obtaining a specific product. When a particular catalyst and a particular feed stock are chosen, the variety of useful products obtained by varying operating conditions is very limited.

It would be highly beneficial to be able to increase catalyst activity without reducing its stability or susceptibility to poisons and it would be desirable to be able to regulate the catalyst activity and other properties during processing so that the process could be accommodated to changing conditions.

THE INVENTION

This invention provides a method for dealing with the difficult feed-stocks mentioned above by treating them, in the presence of hydrogen, with a molten catalyst system that includes at least one of a specific group of metal halide catalysts that are promoted with a mineral acid. The metal halide catalyst is at least one metal halide selected from zinc chloride, bromide or iodide, antimony bromide or iodide, tin bromide, titanium iodide, arsenic bromide or iodide, mercuric bromide or iodide, gallium bromide, or bismuth bromide. The metal halide catalyst is promoted with at least one mineral acid that is stable at the reaction conditions, that is a mineral acid that does not decompose at the pressures and temperatures at which the feedstock is treated, or if it decomposes, one that decomposes to an equally effective mineral acid.

The promoted catalyst systems of this invention are so active that hydrocracking can be accomplished at low temperatures and pressures whereby a very desirable product distribution is obtained. A desirable product distribution is one that contains large amounts of liquid hydrocarbons boiling in the gasoline range or higher and as little as possible of hydrocarbons boiling below butane. The lower boiling hydrocarbons such as methane and ethane are not only materials with small market value, but they are so rich in hydrogen that substantial quantities of the hydrogen fed to the process are consumed in saturating fragments of cracked molecules containing one to three carbon atoms. The low temperature operation also preserves the catalyst in that the tendency of a metal halide to be reduced to the metal and the corresponding hydrogen halide increases as the temperature of the reaction increases. The use of the promoted catalyst system also permits highly stable metal halides to be employed as catalyst, which metal halides would be too inactive to be employed without the acid promoter that is a component of the catalyst systems of this invention.

The preferred mineral acids are hydrogen halides, particularly the hydrogen halide that corresponds to the metal halide catalyst, and pyrophosphoric acid which is a very stable acid that may be used as such or may be formed in situ by adding phosphoric acid to the catalyst system. Other mineral acids stable at reaction conditions may also be used including such acids as sulfuric acid, $H_3AsO_4$, $H_3AsO_3$, chlorosulfonic acid and others.

To demonstrate the process of this invention, the results of a number of experiments are set forth below. Table 1 includes data that demonstrate the effectiveness of the invention employing antimony tribromide catalyst under a variety of conditions.

In all of the cases set forth in the following tables, 20 to 30 grams of finely ground Illinois No. 6 coal was charged to an autoclave containing the indicated amount of catalyst. The amount of coal charged and all conversions are based on moisture and ash free (MAF) coal, and therefore these data measure the amount of material capable of being converted.

TABLE 1

| Metal Halide | SbBr$_3$ | SbBr$_3$ | SbBr$_3$ | SbBr$_3$ | SbBr$_3$ | SbBr$_3\cdot$2NH$_4$B |
|---|---|---|---|---|---|---|
| Amount (g) | 150 | 150 | 150 | 150 | 150 | 140 |
| Acid | — | HBr | — | HBr | H$_4$P$_2$O$_7$ | HBr |
| Amount (g) | — | 11 | — | 11 | 20 | 20 |
| Temperature (°C) | 230 | 230 | 280 | 280 | 280 | 350 |
| Pressure (psi) | 1700 | 1700 | 1700 | 1700 | 1700 | 1700 |
| Hydrogen consumed (g/100 g MAF) | — | 3.54 | 5.3 | 6.7 | 4.6 | 4.5 |
| Products (g/100 g MAF) | | | | | | |
| C$_1$–C$_3$ | — | 0.15 | 0.49 | 1.13 | 0.70 | 2.34 |
| C$_4$–250°C | — | 13.03 | 7.12 | 27.0 | 13.81 | 14.8 |

It may be seen from Table 1 that at 230° C, antimony tribromide is not an effective catalyst, whereas antimony tribromide promoted with hydrogen bromide at 230° F is a very effective catalyst causing a large amount of conversion of coal into liquid hydrocarbons boiling below 250° C distributed largely in the gasoline and kerosene boiling ranges. At 280° C the promoted antimony bromide catalyst produces about a four-fold increase in products boiling in the gasoline range as compared with unpromoted antimony bromide at the same temperature. Table 1 also indicates that antimony tribromide may also be promoted with pyrophosphoric acid and at 280° C, the promoted antimony bromide catalyst not only produces a great deal more conversion, but conversion to a more favorable product than when unpromoted antimony tribromide is used. Finally, Table 1 indicates that through the use of the promoter of this invention, even a poisoned and deactivated catalyst may have some activity restored. The ammonium bromide antimony bromide complex as shown in Table 1 is a compound that results from the reaction of ammonia, hydrogen and antimony tribromide. The formation of this compound represents a loss of catalyst activity in that the complex, although having hydrogenation activity, has substantially no cracking activity. To demonstrate the effectiveness of the promoters of this invention, a catalyst consisting of hydrogen bromide and 100 percent ammonium complex, that is, a catalyst that is entirely poisoned, was employed as the catalytic material, and as may be seen, a substantial conversion to lower boiling products was obtained, although the catalyst system was used at relatively high temperatures compared with unpoisoned catalyst and promoted unpoisoned catalyst.

Table 2 illustrates the process of the present invention as applied to tin bromide catalysts.

TABLE 2

| Metal Halide | SnBr$_2$ | SnBr$_2$ | SnBr$_4$ | SnBr$_2$ |
|---|---|---|---|---|
| Amount (g) | 175 | 175 | 125 | 175 |
| Acid | — | HBr | HBr | H$_4$P$_2$O$_7$ |
| Amoung (g) | — | 20 | 20 | 20 |
| Temperature (°C) | 320 | 320 | 350 | 325 |
| Pressure (psi) | 1700 | 1700 | 1700 | 1700 |
| Hydrogen Consumed (g/100 g MAF) | 1.9 | 4.5 | 2.6 | 3.7 |
| Products (g/100 g MAF) | | | | |
| C$_1$–C$_3$ | 1.98 | 5.80 | 5.70 | 6.27 |
| C$_4$–250°C | 2.29 | 30.4 | 21.0 | 25.3 |

From Table 2 it is evident that a substantial increase in catalyst activity is achieved when the tin bromide catalyst is promoted with hydrogen bromide. It is also demonstrated in Table 2 that either the stannous or the stannic form of the catalyst has substantial activity in the temperature ranges employed. Furthermore, Table 2 illustrates that the tin bromide catalyst may be promoted with pyrophosphoric acid as well as with hydrogen bromide.

Table 3 illustrates various zinc halide catalysts employed in the process of the present invention.

TABLE 3

| Metal Halide | ZnBr$_2$+KBr | ZnBr$_2$+KBr | ZnCl$_2$ |
|---|---|---|---|
| Amount (g) | 108+41 | 108+41 | 110 |
| Acid | — | HBr | HSO$_3$Cl |
| Amount (g) | — | 7 | 20 |
| Temperature (°C) | 320 | 320 | 320 |
| Pressure (psi) | 1700 | 1700 | 1700 |
| Hydrogen Consumed (g/100 g MAF) | 0.27 | 0.87 | 1.4 |
| Products (g/100 g MAF) | | | |
| C$_1$–C$_3$ | 0.59 | 2.11 | 1.49 |
| C$_4$–250°C | 2.34 | 12.06 | 7.24 |

Zinc bromide is mixed with potassium bromide to obtain a low melting salt mixture that can be used as a liquid phase catalyst at the temperatures involved in the process of this invention. Table 3 illustrates the substantial increase in catalyst activity when hydrogen bromide is employed to promote the zinc bromide-potassium bromide molten salt mixture. Table 3 also illustrates that zinc chloride may be employed as a catalyst in the process of this invention, and that chlorosulfonic acid is a suitable acid for promoting the zinc chloride catalyst.

Table 4 illustrates that a great increase in catalyst activity is obtained when mercuric iodide is promoted with hydrogen iodide. The data in Table 4 indicate that a substantial increase in the yield of useful products is obtained even at lower temperature when promoted mercuric iodide catalyst is used instead of unpromoted mercuric iodide.

TABLE 4

| Metal Halide | HgI$_2$ | HgI$_2$ |
|---|---|---|
| Amount (g) | 220 | 220 |
| Acid | — | HI |
| Amount (g) | — | 20 |
| Temperature (°C) | 300 | 275 |
| Pressure (psi) | 1700 | 1700 |
| Hydrogen Consumed (g/100 g MAF) | 3.5 | 4.3 |
| Products (g/100 g MAF) | | |
| C$_1$–C$_3$ | 2.6 | 6.3 |
| C$_4$–250°C | 31.1 | 44.4 |

Table 5 illustrates without comparative data some other metal halide-acid promoter catalyst systems that may be employed. In all cases, the promoted metal halide demonstrates substantially higher catalytic activity than the unpromoted molten salt used alone.

TABLE 5

| Metal Halide | TiI$_3$ | HgBr$_2$ |
|---|---|---|
| Amount (g) | 77 | 200 |
| Acid | HI | HBr |
| Amount (g) | 23 | 20 |
| Temperature (°C) | 250 | 325 |
| Pressure (psi) | 1700 | 1700 |
| Hydrogen Consumed (g/100 g MAF) | 4.9 | — |
| Products (g/100 g MAF) | | |
| C$_1$–C$_3$ | 0.97 | 4.6 |
| C$_4$–250°C | 11.2 | 27.5 |

Results equivalent to those reported in Tables 1–5 are obtained using other metal halides and combinations of the metal halides with various mineral acids.

What is claimed is:

1. In a process for hydrocracking heavy hydrocarbons which comprises contacting the heavy hydrocarbons, at hydrocracking conditions under hydrogen pressure, with a molten metal halide catalyst system selected from the group consisting of zinc chloride, zinc bromide, zinc iodide, antimony bromide, antimony iodide, tin bromide, titanium iodide, arsenic bromide, arsenic iodide, mercuric bromide, mercuric iodide, gallium bromide and bismuth bromide, the improvement which comprises promoting the activity of said catalyst system by adding thereto a mineral acid that is stable at hydrocracking conditions.

2. The process of claim 1 wherein the mineral acid is the hydrogen halide that corresponds to the halogen portion of the metal halide.

3. The process of claim 1 wherein the mineral acid is pyrophosphoric acid.

4. The process of claim 1 wherein the metal halide is antimony tribromide and the mineral acid is hydrogen bromide.

5. The process of claim 1 wherein the mineral acid is sulfuric acid.

* * * * *